Patented Sept. 26, 1944

2,359,103

UNITED STATES PATENT OFFICE 2,359,103

PLASTICIZATION OF RESINOUS COMPOSITIONS

Howard L. Gerhart and George E. Eilerman, Milwaukee, Wis., assignors to Pittsburgh Plate Glass Company, a corporation of Pennsylvania No Drawing. Application September 12, 1941, Serial No. 410,602

6 Claims. (Cl. 260—36)

The present invention relates to resins of the type obtained by conjointly polymerizing an $\alpha\beta$ ethylenic dicarboxylic acid and a polymerizable vinyl compound.

One object of the invention is to provide a simple and economical method of increasing the toughness and flexibility of resins of the foregoing type.

It has heretofore been proposed to prepare artificial resins by conjointly polymerizing an ethylenic $\alpha\beta$ dicarboxylic acid, such as maleic acid, or fumaric acid and a vinylic compound, such as styrene. Generally the resultant products were white powdery substances which were soluble in dilute alkalies.

In Patent 2,230,240 and, also, in a copending application Serial No. 242,127, filed November 23, 1938, to Howard L. Gerhart, are disclosed processes of conjointly polymerizing ethylenic $\alpha\beta$ dicarboxylic acids or anhydrides thereof and polymerizable olefins in such manner as to obtain clear, hard and strong resins ideally suited for use as embedment media for specimens of various kinds, for molding to form objects, such as costume jewelry and the like. These resins, according to the foregoing application, may be prepared by admixing the acid or anhydride, e. g., maleic acid anhydride and the vinylic compound, e. g., styrene or other equivalents or by dissolving the components in a mutual solvent such as triacetin. The reaction mixture is then subjected to actinic irradiation, preferably at a temperature within a range of about 20 to 50° C. As a result of this treatment a polymerization will occur and usually within a period of about one hour a clear, hard resinous product, which is resistant to alkalies and solvents, will be obtained. If the reaction occurs in a solvent medium, such as triacetin, the latter will be absorbed or taken up by the resin body.

Heretofore difficulty has been experienced in the plasticization of the resin compositions to obtain products of low shrinkage, a maximum degree of hardness, flexibility and toughness because very few conventional plasticizers possess sufficient degree of solubility or compatibility with the resin to be suitable for the purpose.

The present invention is based upon the discovery that the nitro derivatives of alkanes, e. g., nitromethane, nitroethane, 1 or 2 nitropropane, nitrobutane and the like compounds, are compatible with, and are excellent plasticizers for resins of the type of the copolymer of styrene and maleic anhydride. The plasticizers are normally relatively volatile compounds, but they may be employed as media for copolymerization of styrene and maleic anhydride, and as a result of the reaction they are absorbed or taken up in the resultant resinous body. In the latter they are relatively permanently bound and do not evaporate even after long exposure of the bodies in the open air.

The following comprise typical examples illustrating the preparation of plasticized resin bodies by the method constituting the present invention:

Example 1

| | Parts |
|---|---|
| Maleic anhydride | 25 |
| Styrene | 31 |
| Nitromethane | 20 |
| Dimethyl phthalate or methyl levulinate | 15 |

The mixture is heated with 0.1% benzoyl peroxide until it forms a light syrup. It is cooled to prevent violent boiling and poured into any desired mold. It will harden in a day to a clear transparent gummy plastic. This reaction can be hastened by subjecting the syrup to actinic radiation. This plastic could be hardened by baking it at a temperature below that of charring or decomposing.

Example 2

| | Parts |
|---|---|
| Maleic anhydride | 25 |
| Styrene | 30 |
| Nitromethane | 30 |

Subjected to the same treatment as in Example 1 or irradiated directly without preliminary heating to the sirupy state it forms a soft flexible resin which is very tough and elastic.

The following compositions are all polymerized to a very hard, clear, strong transparent resin by the means already described in this and in copending applications:

Example 3

| | Parts |
|---|---|
| Maleic anhydride | 25 |
| Styrene | 31 |
| Nitroethane | 25 |

Example 4

| | Parts |
|---|---|
| Maleic anhydride | 25 |
| Styrene | 30 |
| 2-nitropropane | 18 |

Example 5

| | Parts |
|---|---|
| Maleic anhydride | 50 |
| Styrene | 60 |
| Nitroethane | 10 |

Example 6

| | Grams |
|---|---|
| Maleic anhydride | 25 |
| Styrene | 31 |
| Sucrose octaacetate | 15 |
| Nitromethane | 6 |

In Example 6 when the nitromethane is omitted the resin will contain small dispersed crystals of the sucrose octaacetate.

Example 7

Hydroxy compounds are not plasticizers for these resins but when the hydroxy compounds contain in addition the nitro grouping such compounds become excellent plasticizing agents.

| | Grams |
|---|---|
| Maleic anhydride | 25 |
| Styrene | 30 |
| 2-nitro-1-butanol | 31 |

Example 8

| | Grams |
|---|---|
| Maleic anhydride | 25 |
| Styrene | 32 |
| 2-nitro-2 methyl-1-propanol | 20 |

The esterification of the carboxyls of the ethylenic $\alpha\beta$ dicarboxylic acid in Examples 1 to 8 is, also, contemplated as being within the purview of the invention. This may be accomplished by subjecting mixtures of plasticizer, such as nitroethane, acid, such as maleic acid, vinylic compound, such as styrene and alcohols, such as ethyl alcohol, butyl alcohol, stearyl alcohol or alcohols obtained by hydrogenation of free acids of drying oils, such as linseed oil, or tung oil to conditions to obtain esterification and polymerization.

If preferred, the dicarboxylic compound may be esterified before it is introduced into the mixture for polymerization.

The preparation of plasticized resins, in which some or all of the carboxyls are esterified by glycerols or glycols, such as ethylene glycol, diethylene glycol and the like, is contemplated. These esters will contain free hydroxyls and these may further be esterified with acids, such as stearic acid, oleic acid, free acids of linseed oil or tung oil, etc.

Further mixed esters may be prepared by esterifying a part of the carboxyls by means of monohydroxy alcohol and the remainder with a di or tri hydroxy alcohol. Again the free hydroxyls of the mixed esters may be esterified with mono carboxylic acids, such as those above enumerated.

The preparation of these various types of ester resins is discussed in greater detail in an application for patent to Howard L. Gerhart and William W. Bauer, Serial No. 323,945, filed March 14, 1940.

It will be apparent that the polymerizations may be conducted with the reactants in a suitable container or mold designed to impart a desired shape or contour to the resultant bodies. The molds may be of glass or plastic designed to admit of irradiation of the reactants to speed up polymerization. In some instances the molds may be open, or covered with transparent coverings admitting of irradiation of an exposed surface of the contents. It will be apparent that the maleic anhydride and styrene may also be partially polymerized in any convenient container and while the polymer is still sufficiently fluid it may be poured into a mold and there subjected to further polymerization.

Partially polymerized mixtures in a fluid state may be brushed or sprayed upon surfaces of wood, stone, steel or the like and then hardened by irradiation or baking to provide hard, durable coatings.

Objects, such as butterflies and insects in general, or objects of art and various types of specimens, may be embedded in the partially polymerized resin while the latter is fluid. Upon further polymerizing the resin, specimens permanently embedded in a hard, transparent protective medium, are obtained.

In a further application of the invention a solution of maleic anhydride and styrene prepared in accordance with one of the preceding examples, e. g., Example 1, may be prepared and introduced between two sheets of glass. Upon irradiation of the sheets, polymerization of the reactants will result and the sheets will be adhered or bonded together to provide a safety glass of the type used in vehicles and the like.

In a still further application of the invention the hardened resin may be polymerized to obtain a powder which can be molded under heat and pressure into bodies of any desired form.

The formation of resin films, for example, by spreading the partially polymerized ingredients in a liquid state upon polished revolving drums and there subjecting them to further hardening, is contemplated. These can be stripped from the drum.

It will be apparent that the resins after they have reached a solid state may be further hardened by subjecting them to a baking operation at a temperature below that of decomposition or charring.

The addition of pigments, such as titanium dioxide, zinc oxide, white lead, lithopone or the like and coloring matters, such as organic dyes, is contemplated. These pigments may be used in amounts, for example, of 5 to 70%, based on solids content. Wood flour or paper pulp may also be added.

The forms of the invention herein described are to be considered merely as being exemplary. It will be apparent to those skilled in the art that numerous modifications may be made therein without departure from the spirit of the invention or the scope of the appended claims.

What we claim is:

1. As a resinous composition a polymer of an $\alpha\beta$ unsaturated $\alpha\beta$ dicarboxylic acid and styrene, which composition is permanently plasticized with a nitroalkane containing from 1 to 4 carbon atoms in the hydrocarbon group, said nitroalkane being imbibed in the resin.

2. A process of forming a plasticized resin comprising copolymerizing maleic anhydride and styrene in solution in a nitroalkane containing from 1 to 4 carbon atoms in the hydrocarbon group.

3. A process of forming a plasticized resin, which comprises copolymerizing styrene and maleic anhydride in solution in nitroethane.

4. A process of preparing a plasticized resin, which comprises copolymerizing styrene and maleic anhydride in solution in a 1 hydroxy 2-nitroalcohol containing 4 carbon atoms in the hydrocarbon group.

5. A process of forming a plasticized resin, which comprises copolymerizing an $\alpha\beta$ unsaturated $\alpha\beta$ dicarboxylic acid anhydride and styrene in solution in a nitroalkane containing from 1 to 4 carbon atoms in the hydrocarbon group, said nitroalkane being adapted to be imbibed into the resin to provide a permanent plasticizer.

6. A process of forming a plasticized resin comprising copolymerizing styrene and maleic anhydride in solution in a compound selected from a group consisting of nitroalkanes containing 1 to 4 carbon atoms in the hydrocarbon group and the hydroxy derivatives of said nitroalkanes.

HOWARD L. GERHART.
GEORGE E. EILERMAN.